(12) United States Patent
Newcombe et al.

(10) Patent No.: US 9,275,325 B2
(45) Date of Patent: Mar. 1, 2016

(54) DUAL-FUNCTION CARD WITH KEY CARD FUNCTIONALITY AND STORED VALUE CARD FUNCTIONALITY

(71) Applicant: Starbucks Corporation, Seattle, WA (US)

(72) Inventors: Jeffrey Brian Newcombe, Federal Way, WA (US); Ryan Andrew Post, Federal Way, WA (US)

(*) Notice: Subject to any disclaimer, the term of this patent is extended or adjusted under 35 U.S.C. 154(b) by 0 days.

(21) Appl. No.: 14/635,756

(22) Filed: Mar. 2, 2015

(65) Prior Publication Data

US 2015/0254549 A1 Sep. 10, 2015

Related U.S. Application Data

(60) Provisional application No. 61/949,657, filed on Mar. 7, 2014.

(51) Int. Cl.
*G06K 5/00* (2006.01)
*G06K 19/08* (2006.01)
*G06K 19/06* (2006.01)

(52) U.S. Cl.
CPC ........ *G06K 19/083* (2013.01); *G06K 19/06028* (2013.01); *G06K 19/06037* (2013.01); *G06K 19/06196* (2013.01)

(58) Field of Classification Search
CPC ... G07F 19/20; G07F 7/1008; G06Q 20/1085; G06Q 20/341; B42D 15/10; G06K 19/06187; G06K 19/12; G06K 19/06037; G06K 7/14
USPC .......................... 235/379, 380, 487, 493, 492
See application file for complete search history.

(56) References Cited

U.S. PATENT DOCUMENTS

| | | | |
|---|---|---|---|
| 4,973,828 A | 11/1990 | Naruse et al. |
| 5,000,508 A | 3/1991 | Woods |
| 5,025,138 A | 6/1991 | Cuervo |
| 5,032,136 A | 7/1991 | Fitzgerald et al. |
| 5,223,699 A | 6/1993 | Flynn |

(Continued)

FOREIGN PATENT DOCUMENTS

| | | |
|---|---|---|
| CN | 1384652 | 5/2001 |
| GB | 2376787 | 12/2002 |

(Continued)

OTHER PUBLICATIONS

L. Scott Tillett, Merchants Grapple with Payment Options—Integration still a hurdle as credit-card alternative emerge, Internet Week, May 22, 2000, Issue 814, pp. 14.

(Continued)

*Primary Examiner* — Karl D Frech
(74) *Attorney, Agent, or Firm* — Knobbe Martens Olson & Bear LLP (57) ABSTRACT

Embodiments described herein generally relate to a dual-purpose, or dual-function, card that provides functionality as a key card to access rooms or other locations within a hospitality venue as well as functionality as a payment card to purchase products or services using a stored value account associated with the dual-function card. Thus, rather than providing a key card and a gift card or stored value card separately, a single card may be provided or used that combines the functionality of the key card and stored value card.

20 Claims, 6 Drawing Sheets

(56) References Cited

U.S. PATENT DOCUMENTS

| | | |
|---|---|---|
| 5,276,311 A | 1/1994 | Hennige |
| 5,397,391 A | 3/1995 | Stramel |
| 5,409,092 A | 4/1995 | Itako et al. |
| 5,440,108 A | 8/1995 | Tran et al. |
| 5,506,393 A | 4/1996 | Ziarno |
| 5,521,966 A | 5/1996 | Friedes |
| 5,577,109 A | 11/1996 | Stimson et al. |
| 5,578,808 A | 11/1996 | Taylor |
| 5,590,038 A | 12/1996 | Pitroda |
| 5,684,291 A | 11/1997 | Taskett |
| 5,689,100 A | 11/1997 | Carrithers et al. |
| 5,696,908 A | 12/1997 | Muehlberger et al. |
| 5,704,046 A | 12/1997 | Hogan |
| 5,744,787 A | 4/1998 | Teicher |
| 5,819,234 A | 10/1998 | Slavin et al. |
| 5,844,230 A | 12/1998 | Lalonde |
| 5,923,016 A | 7/1999 | Fredregill et al. |
| 5,937,391 A | 8/1999 | Ikeda et al. |
| 5,953,710 A | 9/1999 | Fleming |
| 5,956,695 A | 9/1999 | Carrithers et al. |
| 5,969,318 A | 10/1999 | Mackenthun |
| 5,991,413 A | 11/1999 | Arditti et al. |
| 5,991,748 A | 11/1999 | Taskett |
| 6,000,508 A | 12/1999 | Förster |
| 6,000,608 A | 12/1999 | Dorf |
| 6,032,136 A | 2/2000 | Brake, Jr. et al. |
| 6,032,859 A | 3/2000 | Muehlberger et al. |
| 6,038,552 A | 3/2000 | Fleischl et al. |
| 6,044,362 A | 3/2000 | Neely |
| 6,105,009 A | 8/2000 | Cuervo |
| 6,138,911 A | 10/2000 | Fredregill et al. |
| 6,152,365 A | 11/2000 | Kolls |
| 6,167,387 A | 12/2000 | Lee-Wai-Yin |
| 6,167,389 A | 12/2000 | Davis et al. |
| 6,189,787 B1 | 2/2001 | Dorf |
| 6,193,155 B1 | 2/2001 | Walker et al. |
| 6,199,757 B1 | 3/2001 | Kubert |
| 6,282,566 B1 | 8/2001 | Lee, Jr. et al. |
| 6,330,978 B1 | 12/2001 | Molano et al. |
| 6,375,073 B1 | 4/2002 | Aebi et al. |
| 6,405,182 B1 | 6/2002 | Cuervo |
| 6,405,930 B1 | 6/2002 | Kubert |
| 6,427,090 B1 | 7/2002 | Federico et al. |
| 6,427,909 B1 | 8/2002 | Barnes et al. |
| 6,450,407 B1 | 9/2002 | Freeman et al. |
| 6,484,147 B1 | 11/2002 | Brizendine et al. |
| 6,502,745 B1 | 1/2003 | Stimson et al. |
| 6,561,416 B2 | 5/2003 | Kubert et al. |
| 6,575,361 B1 | 6/2003 | Graves et al. |
| 6,581,845 B2 | 6/2003 | Ye |
| 6,594,640 B1 | 7/2003 | Postrel |
| 6,601,771 B2 | 8/2003 | Charrin |
| 6,612,487 B2 | 9/2003 | Tidball et al. |
| 6,615,189 B1 | 9/2003 | Phillips et al. |
| 6,615,190 B1 | 9/2003 | Slater |
| 6,631,849 B2 | 10/2003 | Blossom |
| 6,655,587 B2 | 12/2003 | Andrews et al. |
| 6,700,961 B1 | 3/2004 | Dacloush et al. |
| 6,705,518 B2 | 3/2004 | Park et al. |
| 6,915,277 B1 | 7/2005 | Manchester et al. |
| 7,010,512 B1 | 3/2006 | Gillin et al. |
| 7,083,084 B2 | 8/2006 | Graves et al. |
| 7,101,512 B2 | 9/2006 | Hahs |
| 7,130,828 B2 | 10/2006 | Phillips et al. |
| 7,168,615 B2 | 1/2007 | Smith |
| 7,406,442 B1 | 7/2008 | Kottmeier et al. |
| 7,424,441 B2 | 9/2008 | George et al. |
| 7,430,521 B2 | 9/2008 | Walker et al. |
| 7,512,566 B1 | 3/2009 | Fellner |
| 7,546,946 B2 | 6/2009 | Hefner et al. |
| 7,917,432 B2 | 3/2011 | Courtion et al. |
| 7,954,708 B2 | 6/2011 | Blossom |
| 7,996,318 B2 | 8/2011 | Marcon |
| 8,156,042 B2 | 4/2012 | Winkelman, III et al. |
| 8,511,551 B1 | 8/2013 | Foster et al. |
| 8,579,201 B2 | 11/2013 | Akesson |
| 8,602,301 B1 | 12/2013 | Blossom |
| 2001/0001321 A1 | 5/2001 | Resnick et al. |
| 2001/0028705 A1 | 10/2001 | Adams et al. |
| 2001/0047342 A1 | 11/2001 | Cuervo |
| 2001/0048023 A1 | 12/2001 | Fitzmaurice et al. |
| 2001/0054003 A1 | 12/2001 | Chien et al. |
| 2002/0022966 A1 | 2/2002 | Horgan |
| 2002/0026418 A1 | 2/2002 | Koppel et al. |
| 2002/0049631 A1 | 4/2002 | Williams |
| 2002/0052838 A1 | 5/2002 | Yamada et al. |
| 2002/0066783 A1 | 6/2002 | Sawin |
| 2002/0069122 A1 | 6/2002 | Yun et al. |
| 2002/0091572 A1 | 7/2002 | Anderson et al. |
| 2002/0116324 A1 | 8/2002 | Macias |
| 2002/0138343 A1 | 9/2002 | Weatherford et al. |
| 2002/0138428 A1 | 9/2002 | Spear |
| 2002/0145051 A1 | 10/2002 | Charrin |
| 2002/0152123 A1 | 10/2002 | Giordano et al. |
| 2002/0152124 A1 | 10/2002 | Guzman et al. |
| 2002/0152168 A1 | 10/2002 | Neofytides et al. |
| 2002/0161705 A1 | 10/2002 | Khan et al. |
| 2002/0174016 A1 | 11/2002 | Cuervo |
| 2002/0174019 A1 | 11/2002 | Henderson et al. |
| 2003/0007615 A1 | 1/2003 | Parfait et al. |
| 2003/0015589 A1 | 1/2003 | Jimenez |
| 2003/0023549 A1 | 1/2003 | Armes et al. |
| 2003/0055780 A1 | 3/2003 | Hansen et al. |
| 2003/0055782 A1 | 3/2003 | Slater |
| 2003/0055789 A1 | 3/2003 | Sakuma et al. |
| 2003/0061157 A1 | 3/2003 | Hirka et al. |
| 2003/0066783 A1 | 4/2003 | Butler et al. |
| 2003/0085272 A1 | 5/2003 | Andrews et al. |
| 2003/0088462 A1 | 5/2003 | Carrithers et al. |
| 2003/0101131 A1 | 5/2003 | Warren et al. |
| 2003/0111527 A1 | 6/2003 | Blossom |
| 2003/0130940 A1 | 7/2003 | Hansen et al. |
| 2003/0135462 A1 | 7/2003 | Brake, Jr. et al. |
| 2003/0138343 A1 | 7/2003 | Matsui et al. |
| 2003/0144935 A1 | 7/2003 | Sobek |
| 2003/0147664 A1 | 8/2003 | Suzuki et al. |
| 2003/0149664 A1 | 8/2003 | Haeno et al. |
| 2003/0154163 A1 | 8/2003 | Phillips et al. |
| 2003/0157925 A1 | 8/2003 | Sorber et al. |
| 2003/0158818 A1 | 8/2003 | George et al. |
| 2003/0195849 A1 | 10/2003 | Phillips et al. |
| 2003/0205616 A1 | 11/2003 | Graves et al. |
| 2003/0209608 A1 | 11/2003 | Blossom |
| 2003/0212796 A1 | 11/2003 | Willard |
| 2003/0222136 A1 | 12/2003 | Bolle et al. |
| 2003/0236704 A1 | 12/2003 | Antonucci |
| 2003/0236755 A1 | 12/2003 | Dagelet, Jr. |
| 2004/0006536 A1 | 1/2004 | Kawashima et al. |
| 2004/0007618 A1 | 1/2004 | Oram et al. |
| 2004/0010449 A1 | 1/2004 | Berardi et al. |
| 2004/0024672 A1 | 2/2004 | Brake, Jr. et al. |
| 2004/0050928 A1 | 3/2004 | Bishop et al. |
| 2004/0064412 A1 | 4/2004 | Phillips et al. |
| 2004/0117300 A1 | 6/2004 | Jones et al. |
| 2004/0122736 A1 | 6/2004 | Bressler et al. |
| 2004/0133440 A1 | 7/2004 | Carolan et al. |
| 2004/0172362 A1 | 9/2004 | Hausmann et al. |
| 2004/0186773 A1 | 9/2004 | George et al. |
| 2005/0027648 A1 | 2/2005 | Knowles et al. |
| 2005/0055296 A1 | 3/2005 | Hattersley et al. |
| 2005/0077350 A1 | 4/2005 | Courtion |
| 2005/0080672 A1 | 4/2005 | Courtion et al. |
| 2005/0091116 A1 | 4/2005 | Monk |
| 2005/0114217 A1 | 5/2005 | Monk |
| 2005/0222094 A1 | 10/2005 | Cotten |
| 2005/0284930 A1* | 12/2005 | Hefner et al. .................. 235/382 |
| 2006/0064379 A1 | 3/2006 | Doran et al. |
| 2006/0161947 A1 | 7/2006 | Laksono et al. |
| 2010/0276495 A1 | 11/2010 | Goldstein et al. |
| 2011/0161226 A1 | 6/2011 | Courtion et al. |
| 2011/0276520 A1 | 11/2011 | Levi |
| 2013/0248591 A1 | 9/2013 | Look et al. |

(56) References Cited

U.S. PATENT DOCUMENTS

2013/0311363 A1 11/2013 Ramaci
2013/0341412 A1 12/2013 Johnson

FOREIGN PATENT DOCUMENTS

| | | |
|---|---|---|
| GB | 2377071 | 12/2002 |
| GB | 2377314 | 1/2003 |
| JP | 04-070993 | 3/1992 |
| JP | 08-083309 | 3/1996 |
| JP | 11-259577 | 9/1999 |
| JP | 2001-236529 | 8/2001 |
| JP | 2002-373303 | 12/2002 |
| JP | 2003-091670 | 3/2003 |
| JP | 2003-115018 | 4/2003 |
| JP | 2003-132283 | 5/2003 |
| JP | 2003-151011 | 5/2003 |
| RU | 2150147 | 5/2000 |
| WO | WO 99/03057 | 1/1999 |
| WO | WO 00/49551 | 8/2000 |
| WO | WO 02/47022 | 6/2002 |
| WO | WO 02/102133 | 12/2002 |
| WO | WO 03/071389 | 8/2003 |
| WO | WO 03/088078 | 10/2003 |
| WO | WO 01/54019 | 7/2004 |
| WO | WO 2004/093022 | 10/2004 |
| WO | WO 2005/033997 | 4/2005 |

OTHER PUBLICATIONS

A Versatile Holiday Gift—The Starbucks Card, 2002.
E-Z Pass Online Application, https://ezpass.csc.paturnpike.com/paturnpike/default.asp.
E-Z Pass Peace Bridge Authority Customer Service Center, https://www/pbaezpass.com/getez.
Fast Lane FAQ, http:www.mtafastlane.com/content/faq/answers.html.
Speedpass: How It Works, http://www.speedpass.com/how/index.jsp.
Starbucks Adds Personal Touch to the Starbucks Card, Dec. 12, 2002, Seattle, WA.
Starbucks Brings Customer Service to New Heights for Starbucks Card Users, Jul. 9, 2002, Seattle, WA.
Starbucks Card Deals Customers a Winning Hand, Nov. 27, 2001, Seattle, WA.
Starbucks Commitment to Jumpstart Helps Open Eight New Sites in Next Six Months, Mar. 27, 2002, Seattle, WA.
Starbucks Holiday Product Fact Sheet, Nov. 2002.
Starbucks Japan Launches Card Program Using ValueLink's Program, Jan. 22, 2003, Denver, CO.
Starbucks Launches New Automatic Reload Option for Starbucks Card, Sep. 17, 2002, Seattle, WA.
Visa International Launches Major Smart Card program in Leading Shopping and Entertainment District in Tokyo, PR Newswire, Jul. 15, 1998.

* cited by examiner

DUAL-FUNCTION CARD WITH KEY CARD FUNCTIONALITY AND STORED VALUE CARD FUNCTIONALITY

RELATED APPLICATION

This application claims the benefit of, and priority to, U.S. Provisional Application Ser. No. 61/949,657, filed on Mar. 7, 2014, entitled "DUAL-FUNCTION CARD WITH KEY CARD FUNCTIONALITY AND STORED VALUE CARD FUNCTIONALITY," which is incorporated herein by reference in its entirety.

BACKGROUND

Guests at hotels or other hospitality venues are often given a keycard to be used to access a room or suite for lodging. The keycard is activated by hotel personnel upon check-in by the guest and deactivated upon check-out to prevent further access by the guest.

Guests may also be provided with vouchers or coupons during their stay to be used at in-house dining or retail locations. Hotels or other hospitality venues sometimes have business relationships with off-site entities that allow the guests to bill expenditures to their hotel account by providing room and user identification.

BRIEF DESCRIPTION OF THE DRAWINGS

The features of embodiments of the inventions will become more readily appreciated as the same become better understood by reference to the following detailed description, when taken in conjunction with the accompanying drawings, wherein.

Throughout the drawings, reference numbers are re-used to indicate correspondence between referenced elements. The drawings are provided to illustrate embodiments described herein and not to limit the scope thereof.

DETAILED DESCRIPTION

The following discussion is presented to enable a person skilled in the art to make and use one or more of the present embodiments. The general principles described herein may be applied to embodiments and applications other than those detailed below without departing from the spirit and scope of the disclosure. Therefore, the present embodiments are not intended to be limited to the particular embodiments shown, but are to be accorded the widest scope consistent with the principles and features disclosed or suggested herein.

Embodiments described herein generally relate to a dual-purpose, or dual-function, card that provides functionality as a key card to access assets, rooms or other locations of or within a hospitality venue as well as functionality as a payment card to purchase products or services using a stored value account associated with the dual-function card. Thus, rather than providing a key card and a gift card or stored value card separately, a single card may be provided or used that combines the functionality of the key card and stored value card.

In some embodiments, the dual-function card is used to provide multiple distinct functions controlled or maintained by separate and distinct business entities. For example, the key card functionality may be maintained, controlled, processed or monitored by a hotel owner or manager and a stored value account functionality may be maintained by a distinct business entity or sponsor having retail operations (e.g., providing products or services for sale). The business entity or sponsor maintaining the stored value account functionality may operate a number of sponsor stores, which are business establishments where goods of a particular theme are kept for retail sale or services of a similar theme are provided to consumers. Sponsor stores may not only include business establishments of the sponsor business in which the dual-function card 202 is accepted, but also other business establishments that are licensed to sell goods or provide services created by the sponsor business. In other implementations, the key card functionality and the stored value account functionality are operated by branches, divisions or subsidiaries of a single entity or by a single entity without distinct divisions.

The hospitality venue can include a hotel, a resort, a motel, a cruise chip, casino, a bed and breakfast, vacation rental, condominium or apartment building or association, car rental company, a convention center, and/or the like. The hospitality entity can be an owner, manager or provider of one or more hospitality venues. Key card functionality can include access to rooms or suites intended for lodging and/or to other rooms or facilities, such as meeting rooms, exercise rooms, spa facilities, pool facilities, etc. Key card functionality may also include access to an asset of the hospitality entity. For example, in the case of car rental, the key card functionality can include access to a vehicle and/or initiation of operation of the vehicle.

The dual-function card may be distributed to patrons or guests of a venue (e.g., a hotel) by the hospitality entity (for example, at the time of check-in or vehicle pick-up). The stored value account may be preloaded with a particular monetary amount or value and pre-activated by either the stored value account entity or the hospitality entity prior to distribution by the hospitality entity. In some embodiments, the dual-function card may be activated after distribution to the patron or guest by the hospitality entity.

In accordance with several embodiments, the payment card functionality can advantageously remain active even after deactivation or termination of the key card functionality (e.g., after checkout by a patron or guest or after termination of an event, such as a conference, held at the hospitality venue or after return of a rental vehicle). Thus, the dual-function card serves a purpose following checkout from a hospitality venue by a cardholder, such that the dual-function card is more likely to be retained and not discarded, thereby reducing waste and promoting conservation of resources.

In accordance with several embodiments, a method of facilitating payment using a dual-function card that is specifically designed and adapted to be used both as a key card and a stored value card is provided. The method may include allocating a monetary value (e.g., predetermined amount of money) to a stored value account of a dual-function card to be distributed by a hospitality entity. The dual-function card may include a magnetic stripe associated with key card functionality maintained by the hospitality entity.

In some embodiments, the key card functionality provides a cardholder access to a room or asset of the hospitality entity. In some embodiments, the magnetic stripe is designed to be programmed or encoded and activated to allow a cardholder to access a room maintained by the hospitality entity and may be deactivated to prohibit further access to the room. The deactivation may occur automatically as a result of encoding the magnetic stripe with an expiration date or a total number of days of lodging or other duration of activation. In some embodiments, the deactivation may be performed manually (e.g., by demagnetizing the magnetic stripe) if physical access to the card is provided.

The dual-function card may include a stored value account identifier or information element associated with stored value card functionality maintained by a stored value account entity distinct from the hospitality entity. The stored value account identifier may include a machine-readable code, a radio-frequency identification tag, near field communication tag, or an electronic chip. The stored value account identifier may, upon being scanned, read, or interrogated by a machine or computing device, provide identification of a stored value account maintained by a business entity distinct from the hospitality entity. The stored value account identifier may be used to debit the stored value account during a sales transaction involving a product or service of the business entity. In accordance with several embodiments, the key card functionality is capable of being deactivated without deactivating the stored value card functionality.

The method may also include debiting the stored value account in connection with a first sales transaction while the key card functionality is active and debiting the stored value account in connection with a second sales transaction after the key card functionality has been deactivated. In some embodiments, the stored value card functionality is not active until after deactivation, or termination, of the key card functionality.

Figure 1A:
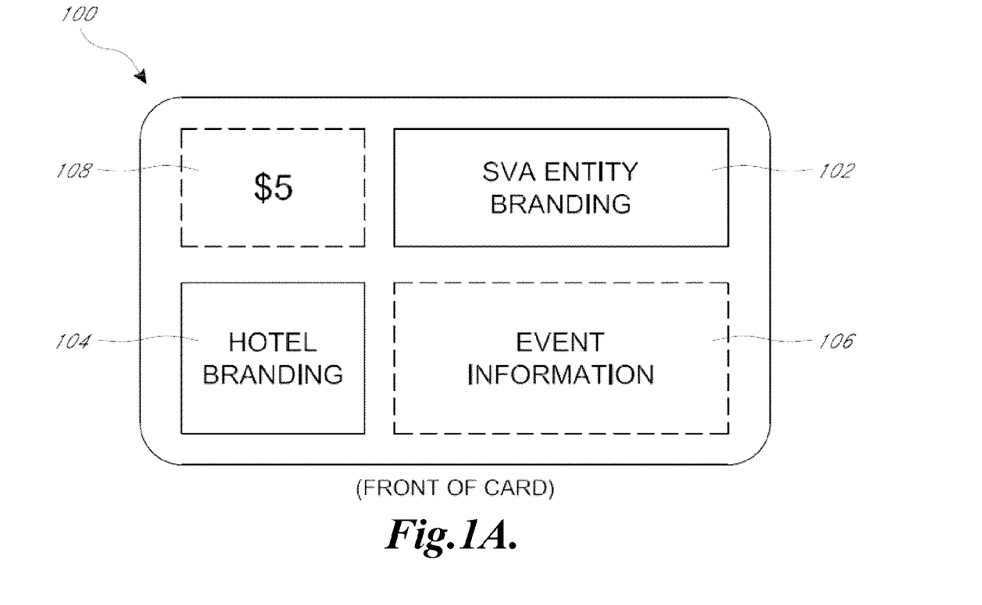
FIGS. 1A and 1B illustrate a schematic representation of an embodiment of a dual-function card.
Figure 1B:
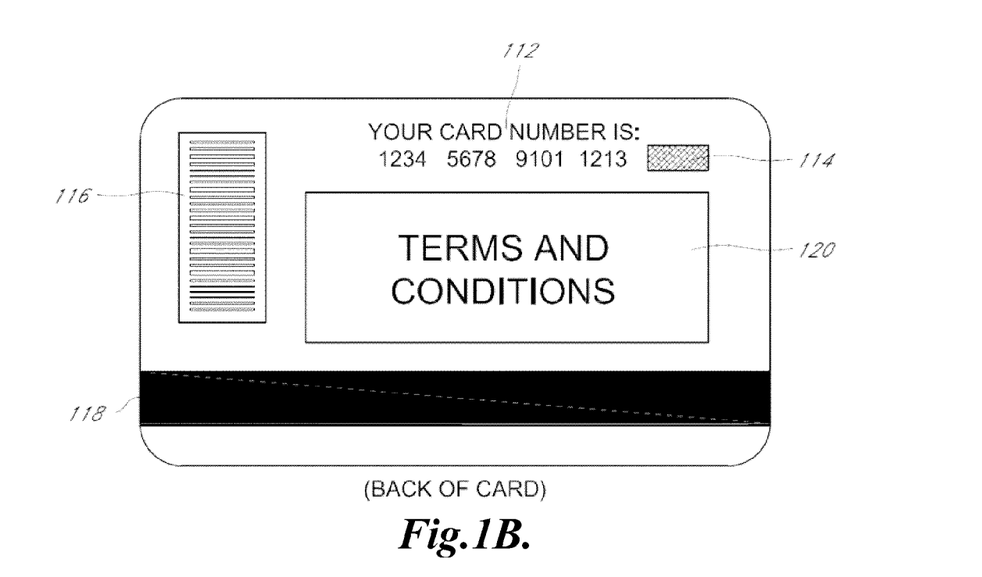

FIGS. 1A and 1B illustrate a front and back, respectively, of an embodiment of a dual-function card 100. Other layouts or designs may also be used. As shown in FIG. 1A, the front of the dual-function card 100 may include branding 102 of the stored value account entity and/or branding 104 of the hospitality entity. Accordingly, the dual-function card 100 may be co-branded by distinct entities that control the distinct functions of the dual-function card 100. The branding 102, 104 may include company logos, slogans, trademarks, service marks, or other images or text. Because the dual-function card 100 is not likely to be discarded after the cardholder leaves the hospitality venue due to the continuing stored value card functionality, the hospitality entity can continue to receive the benefit of advertising from the dual-function card 100 even after the key card functionality has been terminated or deactivated.

The front of the dual-function card 100 can optionally include event information 106 related to an event (e.g., a conference) taking place at the hospitality venue and/or a representation of a monetary value 108 that has been pre-loaded into the stored value account associated with the dual-function card 100.

As shown in FIG. 1B, the back of the dual-function card 100 can include a card number 112, a security code 114 (which may be obscured by a removable substance for security purposes), a stored value account identifier 116, and/or a key card element 118 designed to provide key card functionality. The dual-function card 100 may optionally include a textual description of the terms and conditions associated with the dual-function card 100 and/or an indication of where a cardholder can go to find further information regarding the terms and conditions, such as a network resource (e.g., a website or URL) or a phone number.

The security code 114 may be temporarily obscured or covered to prevent unauthorized use of the stored value card functionality prior to distribution by the hospitality entity. The security code 114 may be revealed for example, by scratching off, or otherwise removing, a material or substance covering the security code 114. In some embodiments, the security code 114 is required to register the stored value account in the name of the cardholder. Registration of the stored value account may provide additional benefits to the cardholder, such as reloading capability, security protection if the card is lost or stolen, rewards or incentives, and/or the ability to transfer value from one card to another. More details regarding registration are provided later in connection with the description of FIG. 5.

The stored value account identifier 116 can be used to identify the stored value account during a sales transaction. The stored value account identifier 116 can be any element or indicia configured to provide identification of a stored value account either from the element itself or from information provided by the element. As shown in FIG. 1B, the stored value account identifier 116 may be an optical bar code capable of being scanned by a bar code reader. In other embodiments, the stored value account identifier 116 is any machine-readable code. For example, the machine-readable code can be a linear ("1D") bar code or a matrix or two-dimensional ("2D") bar code, such as a quick response ("QR") code or an EZCode® bar code. The stored value account may be identified from the information encoded in the bar code or by the bar code itself. In other embodiments, the stored value account identifier 116 is a PDF-417 barcode or other "portable data file" code or a high capacity color bar code. In yet other embodiments, the stored value account identifier 116 is a radio-frequency identification ("RFID") tag or element or a near field communication ("NFC") tag. In still other embodiments, the stored value account identifier 116 is a magnetic stripe (or magstripe) or other element capable of storing data by magnetic encoding or recording. As shown in FIG. 1B, in one embodiment, the stored value account identifier 116 is not a magnetic stripe.

The key card element 118 may be programmed or adapted to provide access to a room for lodging at the hospitality venue (e.g., hotel) or to an asset of the hospitality entity (such as a rental vehicle). In some embodiments, the key card element 118 provides access to rooms or facilities other than those used for lodging, such as meeting rooms, spa facilities, exercise facilities, pool facilities, venue entrances, and/or the like.

As shown in FIG. 1B, the key card element 118 can include a magnetic stripe, or magstripe, capable of storing information. The magnetic stripe may be a high-coercivity ("HiCo") magnetic stripe or a low-coercivity ("LoCo") magnetic stripe. The magnetic stripe may include one, two, three, or more than three tracks for storing information. Each of the tracks may be operated, controlled, or maintained by the same entity or by multiple distinct entities. In one embodiment, the magnetic stripe is a three-track LoCo magnetic stripe. In other embodiments, the key card element 118 can be a machine-readable code, an RFID tag or an NFC tag, or other element configured to be used to provide access to a secure location upon being scanned, interrogated, read or otherwise processed or identified. Different layouts or designs of the card may be used as desired or required. Each card need not include all of the elements illustrated; some of the features may be optional.

The key card element 118 may comprise multiple magnetic stripes (for example, two, three, or more than three magnetic stripes), each of which may have one, two, three or more than three tracks.

In some implementations, a key fob, transponder, or other hardware device or token may be used instead of a card implementation. The key fob or other device or token may have built-in authentication mechanisms to provide the key card functionality. The key fob may also include an RFID or NFC tag or component adapted to provide the stored value card functionality. A key fob implementation may be used, for example, to provide access to assets such as rental vehicles (cars, trucks, golf carts, scooters, segways, motorcycles, and/or the like). The rental vehicles may be powered by electricity, fuel, or a hybrid approach.

Figure 2:
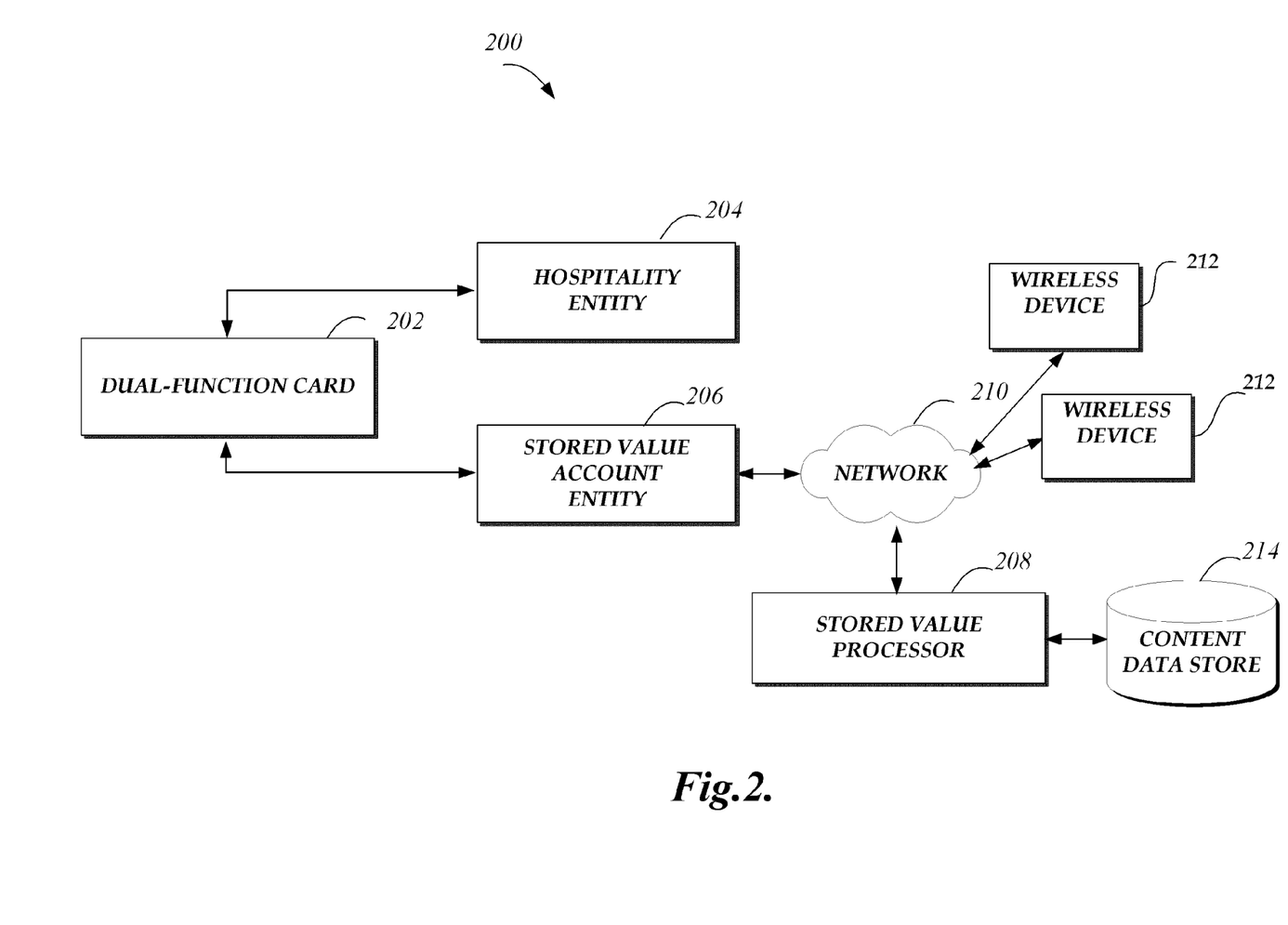
FIG. 2 is a schematic block diagram illustrating a generalized overview of a dual-function card system.

Turning to FIG. 2, a schematic block diagram illustrating a generalized overview of an embodiment of a dual-function card system 200 is provided. Various functions of a dual-function card 202 can be controlled, maintained, processed, managed and/or implemented by a hospitality entity 204 and a stored value account entity 206. For example, in some embodiments, key card functionality of the dual-function card 202 is solely controlled by the hospitality entity 204 and stored value card functionality of the dual-function card 202 is solely controlled by the stored value account entity 206. The hospitality entity 204 and the stored value account entity 206 may be distinct business entities or distinct branches or divisions of a single entity whose businesses do not overlap or whose maintenance or control of the different functions of the dual-function card 202 do not overlap. In some embodiments, the hospitality entity 204 and the stored value account entity 206 are different subsidiaries or branches of a single entity. In some embodiments, portions of the stored value card functionality may be performed by the hospitality entity 204 (independent of or under direction and control of the stored value account entity 206), such as, for example, loading of a card with allocated monetary value or activating the stored value card functionality.

The hospitality entity 204 can include, for example, an owner or manager of one or more hospitality venues (e.g., a hotel chain, a hotel owner, a bed and breakfast owner, a cruise line) or rooms for lodging. In some embodiments, the hospitality entity 204 is any entity that provides key card access to employees, guests, patrons, or other personnel. The hospitality entity 204 may control the key card functionality via activation/deactivation of a magnetic stripe or other key card element. The activation may include programming (e.g., encoding) one or more tracks of the magnetic stripe with information using a magnetic recording device to allow access to a secure room for lodging and/or to one or more other secure rooms or locations. The activation and/or deactivation may not require physical access to the dual-function card 202. Activation may be performed by a representative of the hospitality entity through the use of a computing device coupled to a card encoder or programmer. For example, the computing device may have stored thereon or have access to, via a network, a card encoding or card writing software program or application module. The hospitality entity 204 may not have access to the physical card to deactivate the key card functionality if the cardholder takes the dual-function card without checking out of the hospitality venue in person. Accordingly, upon activation, the key card element (e.g., magnetic stripe) may be programmed to have an expiry date and time or to identify the number of days, hours or other time duration that the cardholder is lodging in a room or authorized to be participating in an event or function, such that the key card functionality automatically terminates or is disabled without physical deactivation or any separate deactivation step being performed.

The stored value account entity 206 can be a retailer or any entity that provides goods or services for sale in a manner that sales transactions can occur over a payment network using a stored value card associated with a stored value account. In one embodiment, the sales transactions do not involve any communication or involvement of the hospitality entity. In some embodiments, the stored value account entity 206 produces and provides (e.g., sells or gifts) the dual-function card 202 to the hospitality entity for distribution. For example, the hospitality entity 204 may purchase a number of dual-function cards 202 preloaded with a particular monetary value to be distributed to guests or patrons of hospitality venues. As another example, the stored value account entity 206 may be sponsoring or co-sponsoring a conference at a particular hospitality venue and may provide dual-function cards preloaded with a particular monetary value free of charge to the hospitality entity 204 for the hospitality entity 204 to distribute to conference attendees (e.g., to increase consumer awareness of the stored value account entity 206 or as a reward or incentive for consumers to patronize the business of the stored value account entity 206).

The stored value account entity 206 may operate a number of business establishments where products or services are sold and/or an electronic commerce service where products or services are sold through one or more network resources (e.g., websites). Payment transactions generated from the use of the dual-function card 202 in the business establishments or using the network resources are communicated to a stored value processor 208 that is in communication with a network 210 (e.g., a closed network) controlled or maintained by the stored value account entity 206. The stored value processor 208 can process stored value payment transactions associated with the stored value account of the dual-function card 202. The payment transactions generated from the use of the dual-function card 202 in the business establishments of the stored value account entity 206 can be facilitated by point-of-sale machines in communication with the stored value processor 208 over the network 210.

Cardholders may initiate sales transactions with the stored value account associated with the dual-function card, add value to the stored value account associated with the dual-function card, or transfer value from the stored value account associated with one dual-function card to another stored value card account of a second dual-function card via a wireless device 212 capable of being communicatively coupled to the network 210. The wireless device 212 may access a network resource of the stored value account entity 206 through an Internet browser or an application software program stored on the wireless device 212. The wireless device 212 may include any personal or mobile computing device, such as a laptop, a tablet, a smartphone, a cellular phone, or any other device capable of accessing a wireless network. The stored value processor 208 is communicatively coupled to a content data store 214 for storing stored value account information. One embodiment of a stored value processor 208 is described in more detail below, in connection with FIG. 6. In other implementations, a wired device may be used that is directly connected to the network 210 by a cable instead of a device that wirelessly connects to the network 210. The network 210 may comprise one or more communications networks, such as telecommunications network(s), computer network(s), the Internet, telephone network(s), data networks, combinations of the same, and/or the like.

Figure 3:
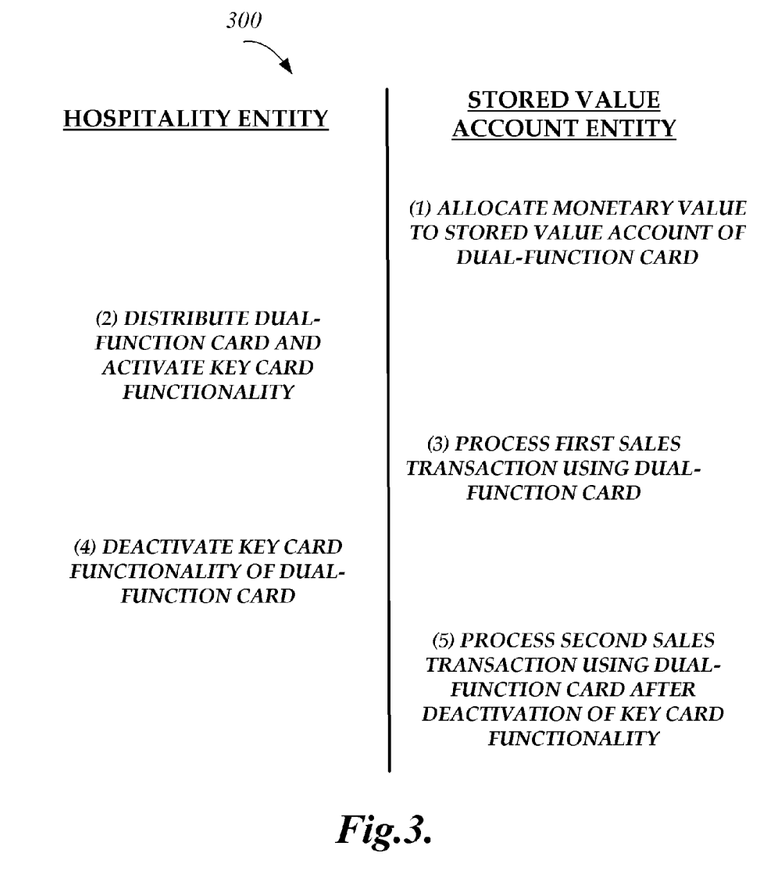
FIG. 3 is a chart illustrating functions that may be performed by, or under the control of, a hospitality entity and a stored value account entity, in accordance with an embodiment.

With reference to FIG. 3, a chart 300 is provided illustrating functions that may be performed by, or under the control of, the hospitality entity 204 and the stored value account entity 206, in accordance with an embodiment. In other embodiments, the functions may be performed by other entities or functions listed as being performed by the stored value account entity 206 may be performed by the hospitality entity 204, or vice-versa.

In some embodiments, the stored value account entity 206 allocates a monetary value (e.g., an amount of money) to a stored value account of the dual-function card 202. In one embodiment, the monetary value is pre-loaded into the stored value account by the stored value account entity 206 prior to distribution of the dual-function card 202 to the hospitality entity 204. In other embodiments, the monetary value is pre-loaded into the stored value account by the hospitality entity after distribution to the hospitality entity by the stored value account entity. For example, the monetary value may be allocated to the stored value account by the stored value account entity providing a list to the hospitality entity 204 of stored value account numbers and monetary values to be allocated to the stored value account numbers so that the hospitality entity 204 can pre-load the stored value accounts of the dual-function cards prior to distribution by the hospitality entity 204 to patrons or guests. For example, the hospitality entity 204 may add value to the dual-function cards by accessing a network resource in communication with the stored value processor 208. In some implementations, the hospitality entity 204 can load its own funds to the stored value account as a promotion.

After a monetary value has been allocated to the stored value account, the hospitality entity 204 may distribute the dual-function card 202 to guests, patrons, conference attendees, etc., who then become cardholders. The dual-function card 202 may be distributed upon check-in or upon event registration at the hospitality venue, or may be distributed beforehand (e.g., by mail or express shipping service). The hospitality entity 204 may also activate key card functionality of the dual-function card 202. Activation of the key card functionality can include programming, writing, or encoding the key card element (e.g., magnetic stripe) to include information (e.g., a room number or security code) to allow access by the cardholder to a room of a hospitality venue or other secure location. In some embodiments, the information includes an identification of the cardholder. Activation may be performed by a card encoder in communication with one or more computing devices capable of executing an encoder software module.

In accordance with some embodiments, the stored value processor 208 of the stored value account entity 206 can process a first sales transaction using the dual-function card 202 after activation of the key card functionality. The processing can include debiting the stored value account by a monetary amount. In some embodiments, the stored value account of the dual-function card 202 is not activated by the stored value account entity 206 until after receipt of an indication that the key card functionality of the dual-function card 202 has been activated. In other implementations, the stored value account may not be associated with a monetary value but may have a point, credit or other non-monetary or indirect monetary value.

The hospitality entity 204 may deactivate, disable or terminate key card functionality of the dual-function card 202 at some point in time. For example, the key card functionality may be terminated upon checkout, at the end of a conference or return of a rental vehicle. The deactivation may occur automatically based on the information (expiration date and time) encoded or stored on the magnetic stripe or other key card element during activation or may be deactivated non-automatically (e.g., physically or otherwise) by a representative of the hospitality entity 204 or the stored value account entity 206. As such, the hospitality entity 204 does not need the physical card to "deactivate" it and may not even take any further action to "deactivate" or disable the key card functionality after activation.

In accordance with several embodiments, the stored value processor 208 operated by the stored value account entity 206 processes a second sales transaction using the dual-function card 202 after deactivation or termination of the key card functionality. The processing can include debiting the stored value account by a second monetary amount (or by a non-monetary point or credit amount). Accordingly, the stored value card functionality of the dual-function card 202 is advantageously retained even after deactivation of the key card functionality. The cardholder can keep the dual-function card for use after leaving the hospitality venue or event.

In accordance with some embodiments, the key card functionality of the dual-function card 202 may be re-activated by the hospitality entity 204 the next time that the cardholder stays at a hospitality venue or attends an event of the hospitality entity 204 (either the same hospitality venue or a different hospitality venue). A different hospitality entity may also be able to reactivate the key card functionality. In other embodiments, the key card functionality cannot be re-activated once de-activated.

Figure 4:
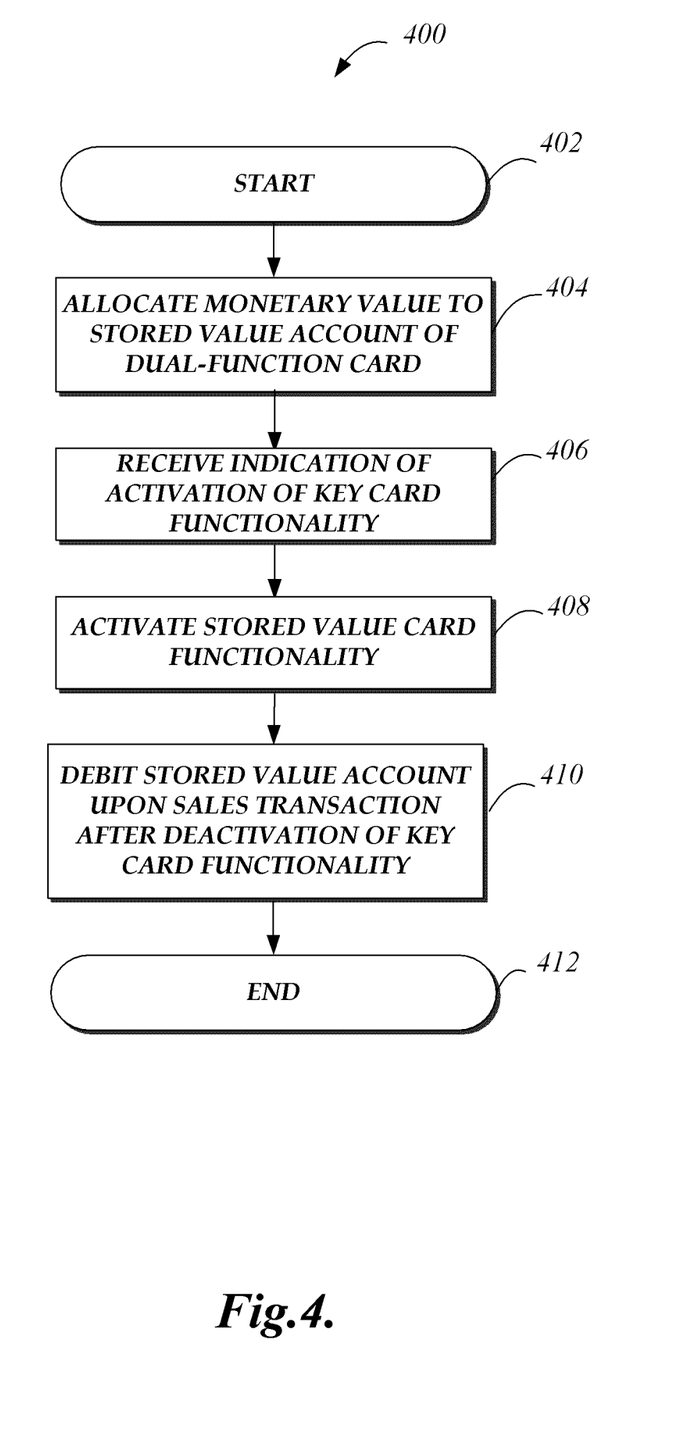
FIGS. 4 and 5 are flow diagrams illustrating embodiments of processes that may be performed in connection with a stored value card functionality of a dual-function card.

FIG. 4 illustrates an embodiment of a process 400 that may be performed in connection with a stored value card functionality of a dual-function card in order to prevent use of the stored value functionality prior to activation of the key card functionality. In some embodiments, all of the steps of the process 400 may be provided by the stored value processor 208 operated, controlled or maintained by the stored value account entity 206.

From a start block 402, the process 400 proceeds to block 404, where a monetary value is allocated to a stored value account associated with the dual-function card 202. The allocation may be performed by the stored value processor 208 and preloaded by the stored value account entity 206 prior to distributing the dual-function card to the hospitality entity 204. In some embodiments, the monetary value is allocated or assigned to the stored value account and provided to a hospitality entity 204 having one or more dual-function cards.

At block 406, the stored value processor 208 receives an indication of activation of key card functionality by the hospitality entity 204. The indication may be received over network 210 or through other means. Upon receipt of the indication, the process 400 proceeds to block 408, where the stored value processor 208 activates the stored value card functionality of the dual-function card 202. By waiting to activate the stored value card functionality until after activation of the key card functionality, unauthorized use of the stored value functionality prior to activation of the key card functionality can be prevented, thereby deterring theft. In some embodiments, step 406 is optional and the stored value functionality is active prior to activation of key card functionality.

Optionally, the process 400 proceeds to block 410, where the stored value processor 208 debits a stored value account in connection with a sales transaction using a stored value identifier (e.g., optical bar code) of the dual-function card 202. In accordance with several embodiments, the stored value account functionality continues even after deactivation of key card functionality. In some embodiments, indication of deactivation of key card functionality may be received by the stored value processor 208. The process 400 terminates execution at block 412. One or more of the steps of process 400 may be optional (e.g., may not be performed) or the steps may be performed in a different order.

Figure 5:
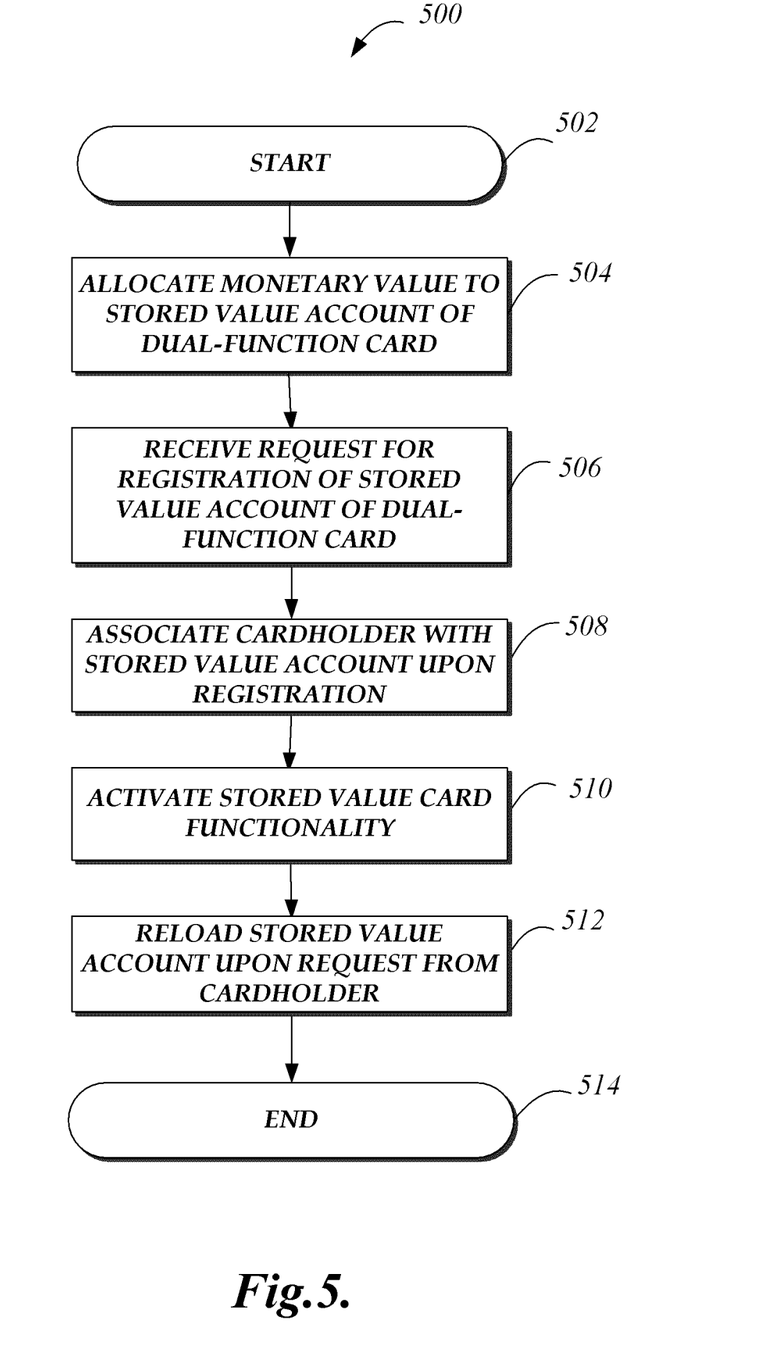

FIG. 5 illustrates an embodiment of a process 500 that involves registration of a stored value account prior to activation of stored value card functionality of the dual-function card 202. The process 500 starts at block 502 and proceeds to block 504, where a monetary value is allocated to the stored value account of the dual-function card 202, as described above. In other implementations, a non-monetary value (e.g., points or credits) may be allocated.

At block 506, a request is received for registration of the stored value account of the dual-function card with the stored value account entity 206 or the hospitality entity 204. The request may be received by the stored value processor 208 over the network 210 via a wireless device 212 or other computing device (which may or may not communicate wirelessly) in communication with the network 210. The registration process may involve the cardholder inputting a stored value account number and/or entering cardholder identification information (e.g., via a user interface of a registration website operated by or on behalf of the stored value account entity 206 or the hospitality entity 204 or via an application running on a mobile computing device, such as a laptop, a tablet, a smartphone, or a cellular phone). In some embodiments, the registration process involves confirmation by the cardholder that the key card functionality of the dual-function card has been activated. The confirmation may be verified independently with the hospitality entity 204. In some implementations, anti-fraud or anti-theft measures may be put in place by the stored value account entity 206 that verifies the name of a registering user against the name of the hotel guest or patron. The name of the hotel guest or patron may be provided by the hospitality entity 204 to the stored value account entity 206 upon keycard activation, for example.

In embodiments where registration requires cardholder identification, the process 500 associates the cardholder with the stored value account at block 508 based on the cardholder identification information. Registration requiring cardholder identification may provide benefits to the cardholder, such as reloading capability, security protection if the card is lost or stolen, rewards or incentives, and/or ability to transfer value from one stored value account to another. In one embodiment, if a registered dual-function card is reported as lost or stolen, an indication may be provided to the hospitality entity 204 that the key card functionality of the dual-function card could be deactivated or terminated in order to prevent unauthorized access.

Upon completion of registration, the process 500 proceeds to block 510, where the stored value card functionality is activated by the stored value processor 208. Activation may involve disabling a block or hold on the stored value account or otherwise identifying the stored value account as being active with the allocated monetary value being available for debit.

In some embodiments, the cardholder may desire to add additional funds or monetary value to the stored value account or reload the stored value account when funds have been depleted. The process 500 may optionally include reloading or incrementing a stored value account with additional funds or monetary value upon request from the cardholder. In some embodiments, the cardholder can request automatic reloading of the stored value account (e.g., when a minimum threshold is met or at a periodic interval). Additional details regarding reloading of stored value accounts, including automatic reloading, are provided in U.S. Pat. No. 8,156,042, issued Apr. 10, 2012, the entire content of which is incorporated herein by reference. The process 500 ends at block 514. One or more of the steps of process 500 may be optional (e.g., may not be performed) or the steps may be performed in a different order. In some implementations, the value is not directly monetary. For example, the value may be in the form of points or credits.

Figure 6:
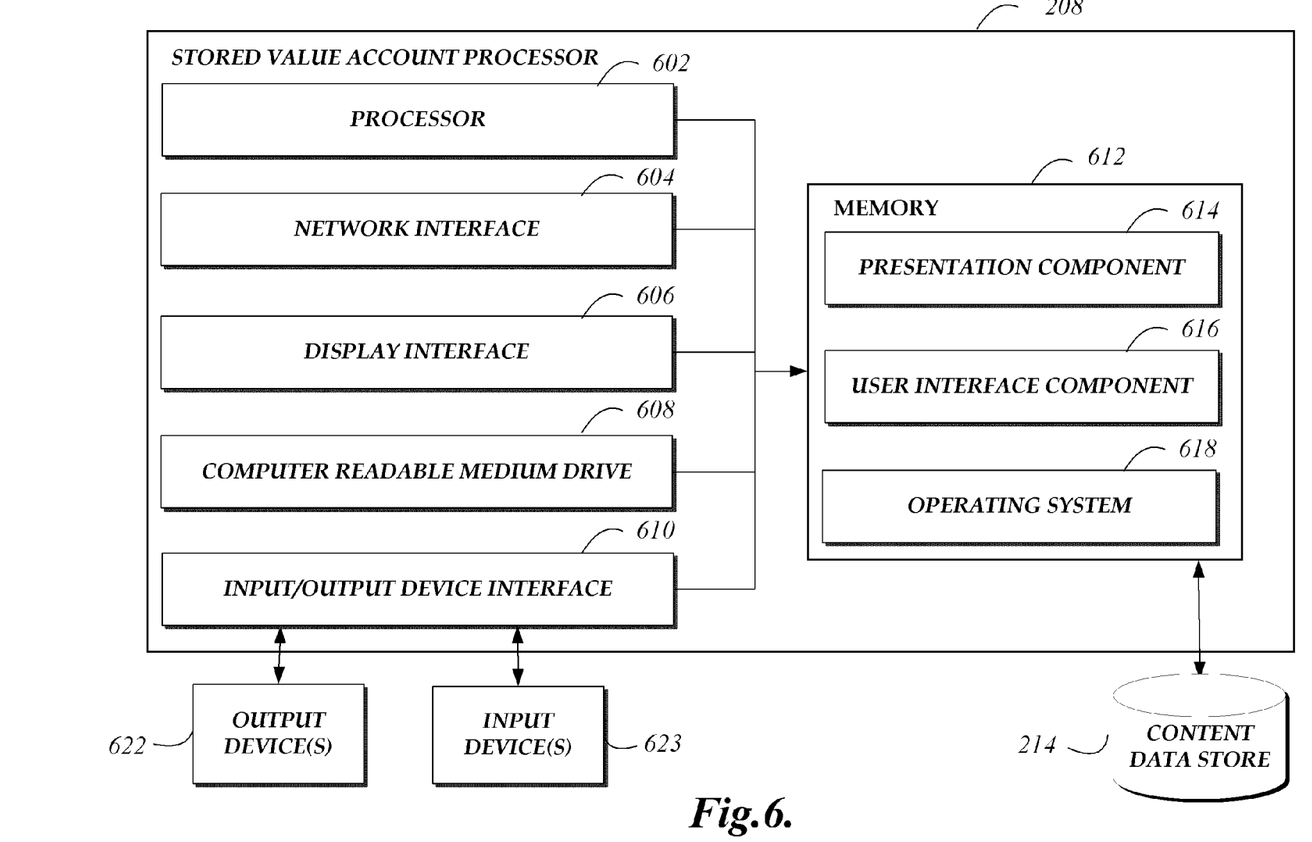
FIG. 6 is a schematic block diagram of a stored value account processor configured to execute processes related to stored value card functionality of a dual-function card, in accordance with an embodiment.

With reference to FIG. 6, a block system diagram illustrating a general architecture of the stored value processor 208 is provided. The stored value processor 208 may include one or more processors 602 in communication with a network interface 604, a display interface 606, a computer readable medium drive 608 and an input/output interface 610, all of which communicate with one another by way of a communication bus. The network interface 604 may provide connectivity to one or more networks or computing systems. The processor(s) 602 may thus receive information and instructions from other computing systems or services via one or more networks. The processor(s) 602 may also communicate to and from memory 612 and further provide output information or receive input information via the display interface 606 and/or the input/output device interface 610. The input/output device interface 610 may accept input from one or more input devices 623, including, but not limited to, keyboards, mice, trackballs, trackpads, joysticks, input tablets, track points, touch screens, remote controls, game controllers, heart rate monitors, velocity sensors, voltage or current sensors, motion detectors, cameras, microphones, or any other input device capable of obtaining a position or magnitude value from a user. The input/output interface may also provide output via one or more output devices 622, including, but not limited to, display devices, one or more speakers or any of a variety of digital or analog audio capable output ports, including, but not limited to, headphone jacks, ¼ inch jacks, XLR jacks, stereo jacks, Bluetooth links, RCA jacks, optical ports or USB ports, as described above. The display interface 606 may be associated with any number of visual or tactile interfaces incorporating any of a number of active or passive display technologies (e.g., electronic-ink, LCD, LED or OLED, CRT, projection, etc.) or technologies for the display of Braille or other tactile information.

Memory 612 may include computer program instructions that the processor(s) 602 executes in order to implement one or more embodiments. The memory 612 generally includes RAM, ROM and/or other persistent or non-transitory computer-readable media. Memory 612 may store a presentation component 614 for managing the output of information to a display and/or other output device(s) 622 via the display interface 606 and/or input/output interface 610. The memory 612 may further include a user interface component 616 for managing and obtaining user input information received from one or more input devices 623 via the input/output device interface 610. The memory 612 may store an operating system 618 that provides computer program instructions for use by the processor(s) 602 in the general administration and operation of the processor(s) 602. The memory 612 may further include other information for implementing aspects of the present disclosure. In addition, memory 612 may include or communicate with the content data store 214, which may be stored on one or more servers or computing devices.

The processor(s) 602 may be any hardware computing device, such as a specific purpose processor, a microprocessor or microcontroller. The processor(s) 602 may be implemented using a single computing device or multiple computing devices.

Although this disclosure describes certain embodiments and examples of dual-function cards and methods of using such dual-function cards, it will be understood by those skilled in the art that many aspects of the methods and devices shown and described in the present disclosure may be differently combined and/or modified to form still further embodiments or acceptable examples. All such modifications and variations are intended to be included herein within the scope of this disclosure. Indeed, a wide variety of designs and approaches are possible and are within the scope of this disclosure. No feature, structure, or step disclosed herein is essential or indispensible. Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Some embodiments have been described in connection with the accompanying drawings. However, the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

All of the processes described herein may be embodied in, and fully automated via, software code modules executed by one or more specialized computers or processors. The code modules may be stored in any type of computer-readable medium or other computer storage device. Some or all the methods may alternatively be embodied in specialized computer hardware. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art. Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Execution in a hosted computing or "cloud" computing environment in some embodiments supports a multiplicity of conditions to be computed contemporaneously.

The various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

It should be emphasized that many variations and modifications may be made to the above-described embodiments, the elements of which are to be understood as being among other acceptable examples. All such modifications and variations are intended to be included herein within the scope of this disclosure and protected by the following clauses and claims.

Clause 1: A computer-implemented method of facilitating payment using a dual-function card that comprises configured to be used both as a key card and a stored value card, the computer-implemented method comprising:
  under control of a computing device configured with specific computer-executable instructions,
    allocating a predetermined amount of money to a stored value account of a dual-function card to be distributed by a hospitality entity,
    wherein the dual-function card comprises:
      a magnetic stripe associated with key card functionality maintained by the hospitality entity, the magnetic stripe configured to be programmed and activated to allow a cardholder to access a room maintained by the hospitality entity and configured to be deactivated to prohibit further access to the room; and
      a barcode associated with stored value card functionality maintained by a stored value account entity distinct from the hospitality entity, the barcode configured to provide identification of the stored value account,
      wherein the key card functionality is capable of being deactivated without deactivating the stored value card functionality;
    debiting the stored value account in connection with a first sales transaction while the key card functionality is active; and
    debiting the stored value account in connection with a second sales transaction after the key card functionality has been deactivated.

Clause 2: The computer-implemented method of Clause 1, wherein the hospitality entity comprises a hotel.

Clause 3: The computer-implemented method of Clause 1, wherein the barcode comprises a linear barcode.

Clause 4: The computer-implemented method of Clause 3, wherein the barcode comprises a PDF-417 barcode.

Clause 5: The computer-implemented method of Clause 1, wherein the barcode comprises a two-dimensional barcode.

Clause 6: The computer-implemented method of any previous clause, wherein allocating the predetermined amount of money to the stored value account comprises preloading the stored value card with the predetermined amount of money prior to distribution by the hospitality entity.

Clause 7: The computer-implemented method of any previous clause, further comprising:
  receiving an indication from the hospitality entity that the key card functionality has been activated; and
  activating the stored value card functionality upon receiving the indication.

Clause 8: The computer-implemented method of any previous clause, further comprising associating the cardholder with the stored value account upon registration of the dual-function card by the cardholder.

Clause 9: The computer-implemented method of Clause 8, further comprising incrementing a balance of the stored value account by a reload amount authorized by the cardholder.

Clause 10: A computer-implemented method of facilitating payment using a dual-function card that is configured to be used both as a key card and a stored value card, the method comprising:
  under control of a computing device configured with specific computer-executable instructions,
    allocating a monetary value to a stored value account of a dual-function card to be distributed by a hospitality entity,
    wherein the dual-function card comprises:
      a magnetic stripe associated with key card functionality maintained by the hospitality entity, the key card functionality configured to provide a cardholder access to a room of the hospitality entity; and
      a stored value account identifier configured to provide identification of a stored value account maintained by a business entity distinct from the hospitality entity, wherein the stored value account identifier is used to debit the stored value account during a sales transaction involving a product of the business entity, wherein a stored value account functionality of the dual-purpose card is functional after deactivation of the magnetic stripe; and
    debiting the identified stored value account by a transaction amount of the sales transaction.

Clause 11: The computer-implemented method of Clause 10, wherein the stored value account identifier comprises a machine-readable code.

Clause 12: The computer-implemented method of Clause 11, wherein the machine-readable code comprises an optical barcode.

Clause 13: The computer-implemented method of any of Clauses 10-12, wherein allocating the monetary value to the stored value account comprises preloading the stored value card with a predetermined amount of money prior to distribution by the hospitality entity.

Clause 14: The computer-implemented method of any of Clauses 10-13, further comprising activating the stored value account functionality after activation of the key card functionality.

Clause 15: A dual-function card configured to be used both as a key card and a stored value card comprising:
  a magnetic stripe configured to provide key card functionality to a cardholder, wherein the magnetic stripe is configured to provide access to an asset of a hospitality entity by the cardholder;
  an optical barcode configured to provide stored value card functionality to the cardholder, wherein the optical barcode is configured to be scanned during a sales transaction to identify a stored value account to be debited in connection with the sales transaction, wherein the stored value account is not maintained by the hospitality entity, and wherein the stored value card functionality of the dual-purpose card is functional after the key card functionality has been terminated by the hospitality entity.

Clause 16: The card of Clause 15, wherein the optical barcode comprises a linear barcode.

Clause 17: The card of Clause 16, wherein the optical barcode comprises a PDF-417 barcode.

Clause 18: The card of Clause 15, wherein the optical barcode comprises a two-dimensional barcode.

Clause 19: The card of Clause 18, wherein the optical barcode comprises a quick response code.

Clause 20: The card of any of Clauses 15-19, wherein the stored value account is inactive prior to termination of the key card functionality by the hospitality entity.

What is claimed is:

1. A dual-function card configured to be used both as a key card and a stored value card comprising:
    a magnetic stripe configured to provide key card functionality to a cardholder, wherein the magnetic stripe is configured to provide access to an asset of a hospitality entity by the cardholder;
    an optical barcode configured to provide stored value card functionality to the cardholder, wherein the optical barcode is configured to be scanned during a sales transaction to identify a stored value account to be debited in connection with the sales transaction,
    wherein the stored value account is not maintained by the hospitality entity, and
    wherein the stored value card functionality of the dual-function card is functional after the key card functionality has been terminated by the hospitality entity.

2. The card of claim 1, wherein the optical barcode comprises a linear barcode.

3. The card of claim 1, wherein the optical barcode comprises a two-dimensional barcode.

4. The card of claim 1, wherein the optical barcode comprises a PDF-417 barcode.

5. The card of claim 1, wherein the optical barcode comprises a quick response code.

6. The card of claim 1, wherein the magnetic stripe comprises multiple tracks.

7. The card of claim 1, wherein the stored value account is inactive prior to termination of the key card functionality by the hospitality entity.

8. The card of claim 1, wherein the stored value account is allocated with a predetermined amount of money prior to distribution by the hospitality entity.

9. The card of claim 1, wherein the cardholder is associated with the stored value account upon registration of the dual-function card by the cardholder.

10. A computer-implemented method of facilitating payment using a dual-function card that is configured to be used both as a key card and a stored value card, the computer-implemented method comprising:
    under control of a computing device configured with specific computer-executable instructions,
    allocating a predetermined amount of money to a stored value account of a dual-function card to be distributed by a hospitality entity,
    wherein the dual-function card comprises:
        a magnetic stripe associated with key card functionality maintained by the hospitality entity, the magnetic stripe configured to be programmed and activated to allow a cardholder to access a room maintained by the hospitality entity and configured to be deactivated to prohibit further access to the room; and
        a machine readable code associated with stored value card functionality maintained by a stored value account entity distinct from the hospitality entity, the machine readable code configured to provide identification of the stored value account,
        wherein the key card functionality is capable of being deactivated without deactivating the stored value card functionality;
    debiting the stored value account in connection with a first sales transaction while the key card functionality is active; and
    debiting the stored value account in connection with a second sales transaction after the key card functionality has been deactivated.

11. The computer-implemented method of claim 10, wherein the hospitality entity comprises a hotel.

12. The computer-implemented method of claim 10, wherein the machine readable code comprises an optical code.

13. The computer-implemented method of claim 12, wherein the optical code comprises a linear barcode.

14. The computer-implemented method of claim 12, wherein the optical code comprises a quick response code.

15. The computer-implemented method of claim 10, wherein the machine readable code comprises at least one of a radio-frequency tag or a near field communication tag.

16. The computer-implemented method of claim 10, wherein the stored value account is inactive prior to deactivation of the key card functionality.

17. The computer-implemented method of claim 10, wherein allocating the predetermined amount of money to the stored value account comprises preloading the stored value card with the predetermined amount of money prior to distribution by the hospitality entity.

18. The computer-implemented method of claim 10, further comprising:
    receiving an indication from the hospitality entity that the key card functionality has been activated; and
    activating the stored value card functionality upon receiving the indication.

19. The computer-implemented method of claim 10, further comprising associating the cardholder with the stored value account upon registration of the dual-function card by the cardholder.

20. The computer-implemented method of claim 19, further comprising incrementing a balance of the stored value account by a reload amount authorized by the cardholder.

* * * * *